(No Model.)
S. J. ADAMS.
PIPE WELDING BALL.
No. 433,589.　　　　　　　　　　Patented Aug. 5, 1890.
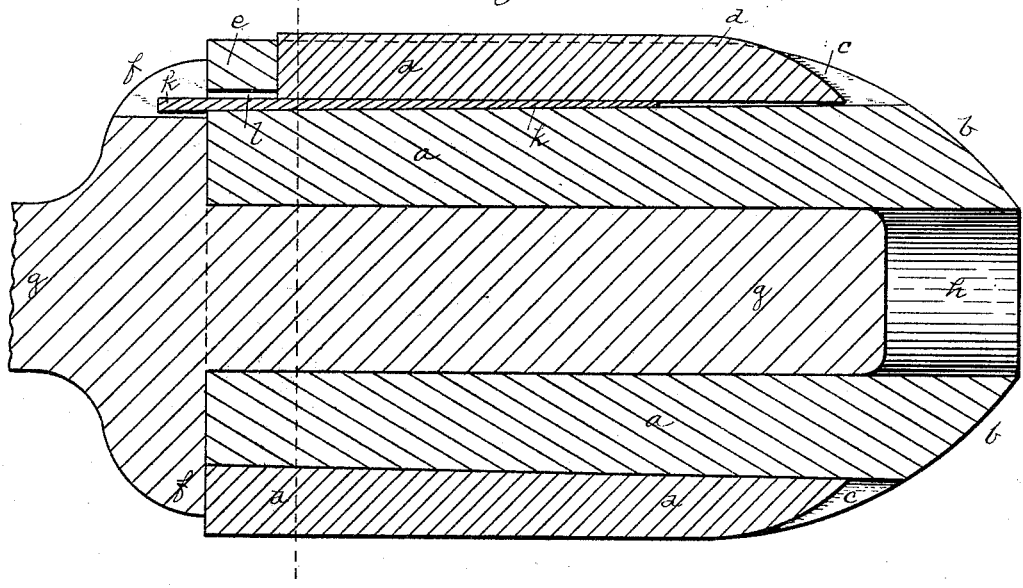
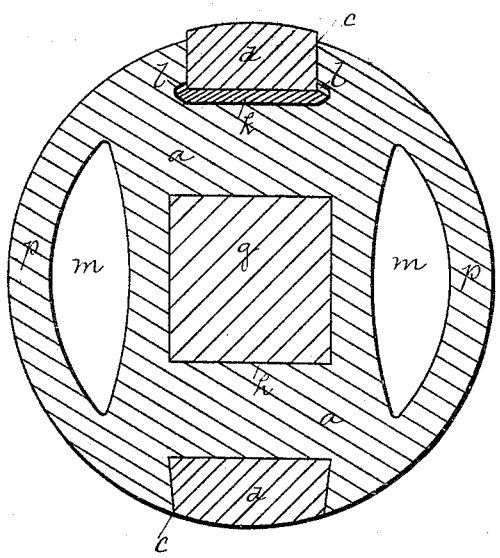
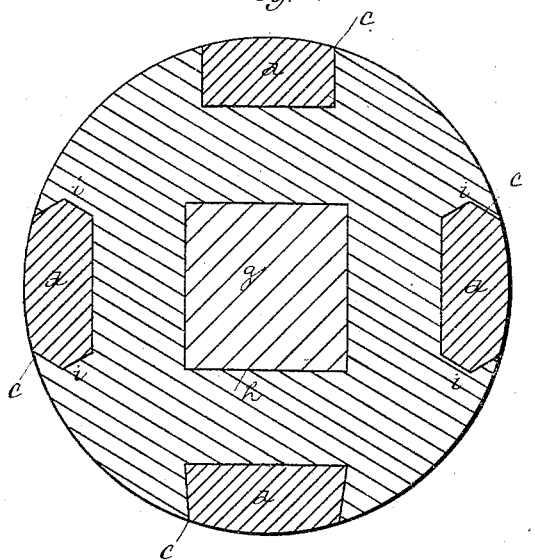
Witnesses:　　　　　　　　　　Inventor
　J. N. Cooke　　　　　　　Stephen Jarvis Adams
　Robt. D. Totten　　　　　By James I. Kay
　　　　　　　　　　　　　　Attorneys

UNITED STATES PATENT OFFICE.

STEPHEN JARVIS ADAMS, OF PITTSBURG, PENNSYLVANIA.

PIPE-WELDING BALL.

SPECIFICATION forming part of Letters Patent No. 433,589, dated August 5, 1890.

Application filed January 6, 1890. Serial No. 335,977. (No model.)

*To all whom it may concern:*

Be it known that I, STEPHEN JARVIS ADAMS, a resident of Pittsburg, in the county of Allegheny and State of Pennsylvania, have invented a new and useful Improvement in Pipe-Welding Balls; and I do hereby declare the following to be a full, clear, and exact description thereof.

My invention relates to pipe-welding balls, its object being to provide a pipe-ball in which the body of the ball may be employed for a large number of welding operations. It is well known that one of the expensive parts of the manufacture of wrought-metal pipe or tubing is the pipe-welding ball; this being especially the case in the manufacture of tubing of very large diameter, tubing now being made twenty-four inches in diameter, and even larger, and the balls employed being very heavy—indeed, so heavy as to require power-operated machinery to handle them. It is also known that the welding operation upon these balls takes place at one particular point—namely, the point where the edges of the skelp are lapped and welded—the principal pressure of the rolls being in a vertical line through the ball, and the edge of the pipe during the welding thereof being pressed together upon the ball along the top thereof, and therefore scoring and cutting into the body of the ball at this point, the side portions of the ball being only employed to hold the pipe cylindrical during the welding operation. As the ball is cut or worn into by the metal at the point of weld, it hollows out this part of the ball, leaving it rough and uneven, and a single ball can only be employed for a very few welding operations, the remainder of the ball acting only to hold the pipe to shape; and as the ball can be used for the welding of not more than half a dozen lengths of pipe, it is evident, especially in the manufacture of these large pipe, that the balls form a very large portion of the expense of manufacture.

The object of my invention is to provide a pipe-welding ball in which the body of the ball may be employed a large number of times, and one in which, while the said portions of the ball are of sufficient strength to hold the pipe in proper cylindrical shape and the ball has sufficient strength to sustain the heavy strain of welding thereon, the ball may be formed lighter and consequently cheaper than the ordinary ball now employed.

To these ends my invention consists, generally stated, in a pipe-ball having a groove extending longitudinally thereof and entering into, but not extending through, its peripheral wall, in combination with an insertible piece or plug fitting into said groove and adapted to receive the wear in the welding operation.

It also consists in such ball having a socket to receive the mandrel, and a pocket on each side of the socket, so as to form the side walls of the ball thin, and so lighten the ball, the top and bottom portions of the ball being of sufficient strength to sustain the welding-pressure.

It also consists in certain other improvements, as will be hereinafter more particularly set forth.

To enable others skilled in the art to make and use my invention, I will describe the same more fully, referring to the accompanying drawings, in which—

Figure 1 is a longitudinal central section of the ball embodying my invention. Fig. 2 is a cross-section of one form thereof, and Fig. 3 is a cross-section of another form thereof.

Like letters of reference indicate like parts in each.

The general outline of my improved ball is the same as that generally employed—namely, a body portion $a$, having its walls parallel with the axis, and a point $b$ to direct the skelp on to the ball during the welding thereof. In the simplest form of such ball I form in the body portion $a$ a longitudinal groove $c$, the side edges of which are practically straight or parallel with each other in cross-section, this groove $c$ thus forming a seat or pocket to receive the insertible piece or plug $d$, which fits into the groove neatly and is held therein by friction. The rear end of this plug $d$ may fit against a shoulder $e$ at the rear end of the ball, or may fit against the annular ring or shoulder $f$ of the mandrel $g$, entering within the socket $h$ of the ball, or the groove $c$ may taper slightly toward the rear end thereof, so that the plug may wedge therein. The insertible plug may be formed with dovetailed or with double-inclined edges, as at $i$, the groove $c$ having correspondingly-shaped side edges, as also shown in the drawings, and in such case, the plug $d$ being held in position by such dovetailed or double-inclined edges, the groove thus forming practically a dovetailed seat for the plug. In such cases the base of the plug will rest upon the base of the groove, which will sustain the pressure during the welding operation. It is well known, however, that according to the thickness of the metal of the tube and according to slight variations in the sizes of the pipes to be produced, it is extremely desirable to provide means by which the same pipe-ball may be increased or decreased in diameter, and so provide within certain limits for the welding of different diameters of pipe upon the same ball and prevent the necessity of the formation of a different ball for each different diameter of pipe to be formed. To accomplish this, especially in the larger size of the ball, I provide a wedge-piece $k$, entering between the base of the groove $c$ and the plug $d$, this wedge-piece being most clearly shown in Fig. 1. The wedge-piece is formed with a long taper, and the base of the groove or the base of the insertible piece or plug is correspondingly tapered, so that the outer or wearing surface of the plug will be parallel with the axis of the ball. This wedge-piece is preferably inserted from the rear of the ball, and it can be driven in by a hammer so as to raise the block $d$ to the desired diameter for the welding, according to the diameter of the pipe to be welded, the welding-plug in such case extending slightly beyond the surface of the body portion of the ball. In such case, in order to sustain the pressure on the plug in case it is not held sufficiently rigid within the ball by the frictional action or binding of the sides of the groove upon the plug, the ball may have the shoulder $e$, and below the same a slot $l$, through which the wedge-piece $k$ may be driven, this being shown in Fig. 1. One or more of these insertible blocks may be employed in the body of the ball as is found desirable, there being four such plugs shown in Fig. 3.

As the balls of the larger sizes are very heavy, as above set forth, in order to lighten them I form on each side of the socket $h$ the pockets $m$, and I form the side walls $p$ of the ball thin, as clearly shown in Fig. 2. These side walls are, however, of sufficient thickness to sustain pressure brought upon them and to hold the pipe to cylindrical shape, while at the same time a sufficient body of metal is provided in a line drawn vertically through the ball to sustain all strain brought upon it, the pressure being, as above set forth, in a vertical line through the ball. In such ball one or more insertible plugs may be employed, as above fully set forth, and when both the thin side walls and the insertible plugs are employed in the ball, in case the ball becomes lodged within the pipe and forms what is termed a "sticker," it may be crushed more easily and removed from the pipe, on account of the thin side walls, as well as the plugs, which, though sufficiently supported to sustain the welding-pressure, are more easily broken by the quick blow of a hammer than the ordinary solid ball.

When my improved ball is in use, the ball is placed upon the mandrel in such position that one of the insertible plugs is brought to the top of the ball along the line where the weld takes place, and during the operation the edges are pressed together upon this insertible piece or plug, the cutting or scouring consequent to the welding of the edges together taking place upon the insertible plug, while the remainder of the ball simply acts to sustain the general pressure thereon and hold the pipe cylindrical. After the welding-operation, in case the plug is cut into to such extent as to prevent its serving to properly weld another ball, the plug may be removed and another inserted in its place, or, if the ball contains more than one plug, the ball may be placed upon the mandrel, so as to bring another such plug to the top thereof and in position to receive the severe action of welding, as above set forth.

In case it is desired to use the ball for the welding of different diameters, the wedge-piece fitting between the plug and the base of the groove may be driven in to such an extent as to raise the plug out of the groove the proper height for the welding operation according to the diameter of the tube to be formed, and the ball is employed in the manner above described.

Where the ball shown in Fig. 2, having the thin side walls, is employed, these side walls, while not of sufficient strength to sustain the direct vertical pressure of welding, will act to hold the pipe to true cylindrical shape and serve all the purposes generally employed by the side portions of the ordinary ball, while the ball itself is lighter in weight and can be handled more easily and much cheaper in cost. With these balls having the insertible pieces or plugs the bodies of the balls can be employed for a long period, as they simply serve to hold the pipe to proper cylindrical shape, having no very great strain upon them and receiving none of the cutting or scoring action incident to the welding of the pipe, and consequently a large saving is obtained in the balls employed for the welding of the tubing, the insertible wearing-plugs being of comparatively small cost. The plugs may also be made of a high quality of iron, while the bodies may be made of a cheaper tougher quality, and in this way I provide the most suitable quality of metal for the portion on which the wielding operation takes place, and this at a comparatively low cost.

What I claim as my invention, and desire to secure by Letters Patent, is—

1. A pipe-welding ball having a groove extending longitudinally thereof and entering into but not extending through its peripheral wall, in combination with an insertible piece or plug fitting into said groove and adapted to receive the wear in the welding operation, substantially as and for the purposes set forth.

2. A pipe-welding ball having a groove extending longitudinally thereof and entering into but not extending through its peripheral wall, in combination with an insertible piece or plug fitting into said groove and adapted to receive the wear in the welding operation, and a wedge fitting between the insertible plug and the base of the groove, substantially as and for the purposes set forth.

3. A pipe welding ball having a socket to receive the mandrel and a pocket on each side of the socket, so as to form the side walls of the ball thin, the welding-pressure being sustained by the top and bottom portions of the ball, substantially as and for the purposes set forth.

4. A pipe-welding ball having a socket to receive the mandrel and a pocket on each side of the socket so as to form the side walls of the ball thin and having a longitudinally-extending groove in the top portion thereof, in combination with an insertible piece or plug fitting in said groove and adapted to receive the wear in the welding operation, substantially as and for the purposes set forth.

In testimony whereof I, the said STEPHEN JARVIS ADAMS, have hereunto set my hand.

STEPHEN JARVIS ADAMS.

Witnesses:
J. N. COOKE,
ROBT. D. TOTTEN.